(12) United States Patent
Yoneda

(10) Patent No.: US 7,048,086 B2
(45) Date of Patent: May 23, 2006

(54) VEHICLE PROTECTION APPARATUS AT COLLISION TIME

(75) Inventor: Kimihisa Yoneda, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 188 days.

(21) Appl. No.: 10/639,654

(22) Filed: Aug. 13, 2003

(65) Prior Publication Data

US 2004/0069555 A1    Apr. 15, 2004

(30) Foreign Application Priority Data

Aug. 26, 2002   (JP)   ............... 2002-245726

(51) Int. Cl.
*B60K 28/10*   (2006.01)
(52) U.S. Cl. ...................... 180/274; 280/735
(58) Field of Classification Search ............ 280/730.1, 280/730.2, 735, 749, 748, 751; 180/274
See application file for complete search history.

(56) References Cited

U.S. PATENT DOCUMENTS

| | | | | |
|---|---|---|---|---|
| 5,072,966 A | * | 12/1991 | Nishitake et al. | ........ 280/730.2 |
| 5,954,384 A | * | 9/1999 | Jones | ......................... 296/95.1 |
| 5,959,552 A | * | 9/1999 | Cho | ............................. 340/903 |
| 6,182,782 B1 | * | 2/2001 | Matsuura et al. | ........... 180/274 |
| 6,467,563 B1 | * | 10/2002 | Ryan et al. | .................. 180/274 |
| 6,497,302 B1 | * | 12/2002 | Ryan | ........................... 180/274 |
| 6,502,859 B1 | * | 1/2003 | Svetlik | ........................ 280/749 |
| 6,554,339 B1 | * | 4/2003 | Moore | ...................... 296/24.43 |
| 6,595,567 B1 | * | 7/2003 | Ament et al. | ............. 296/24.43 |

FOREIGN PATENT DOCUMENTS

| | | | |
|---|---|---|---|
| DE | 10059207 A1 | * | 7/2001 |
| DE | 10062560 A1 | * | 7/2001 |
| JP | 7125604 | * | 5/1995 |
| JP | 7156749 | * | 6/1995 |
| JP | A 7-156749 | | 6/1995 |
| JP | A 7-277114 | | 10/1995 |
| JP | A 8-825667 | | 10/1996 |
| JP | 409030368 A | * | 2/1997 |
| JP | 200466900 | * | 3/2004 |

* cited by examiner

*Primary Examiner*—Paul N. Dickson
*Assistant Examiner*—Toan To
(74) *Attorney, Agent, or Firm*—Oliff & Berridge, PLC

(57) ABSTRACT

When collision detection unit such as a G sensor or a radar sensor detects a collision of a two-wheeled vehicle with a car body, a protection determination unit determines the necessity for protection. When it is determined that protection is required, at least one protection net are unfolded in response to the strength of the collision, etc. If the human body of the driver, passenger, etc., of the two-wheeled vehicle attempts to jump the car body in the collision, the human body can be caught in the protection net for making it possible to prevent a secondary disaster from occurring.

12 Claims, 9 Drawing Sheets

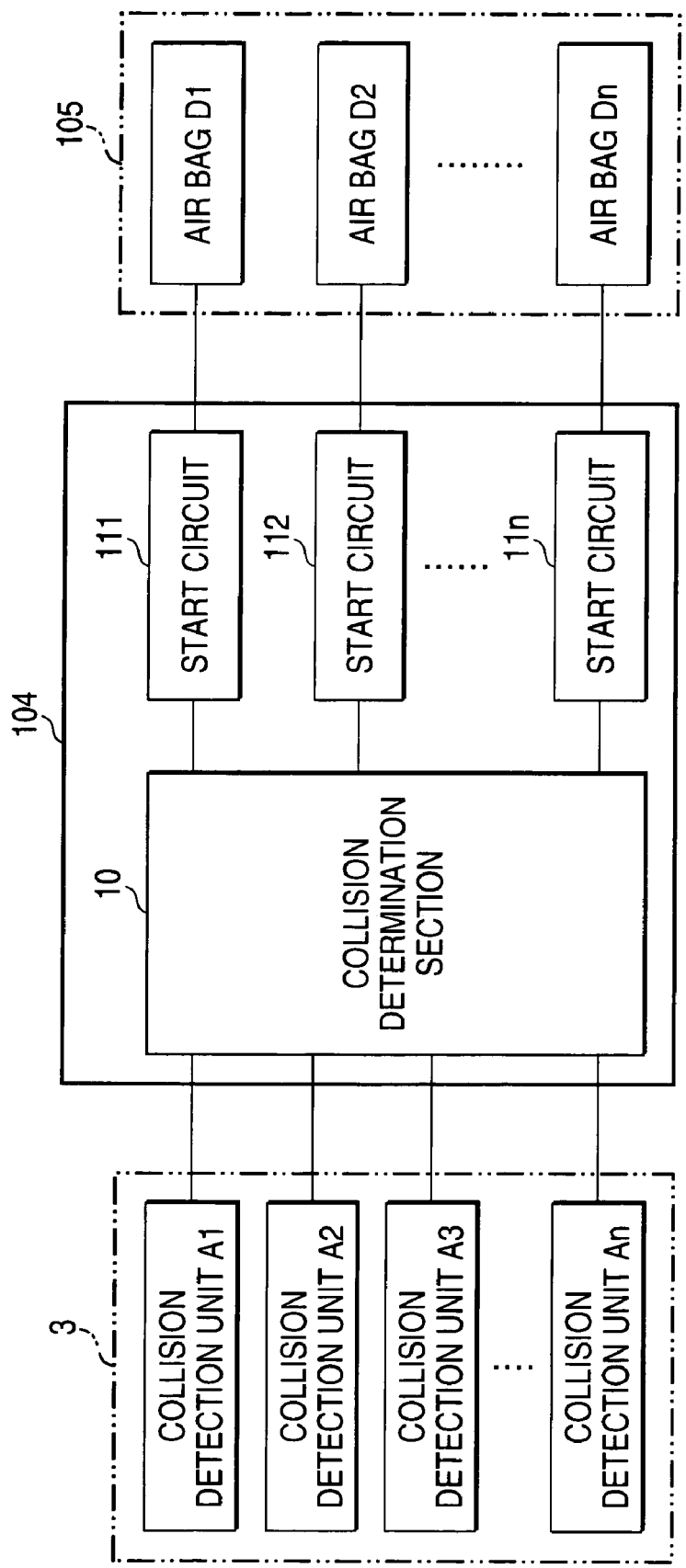

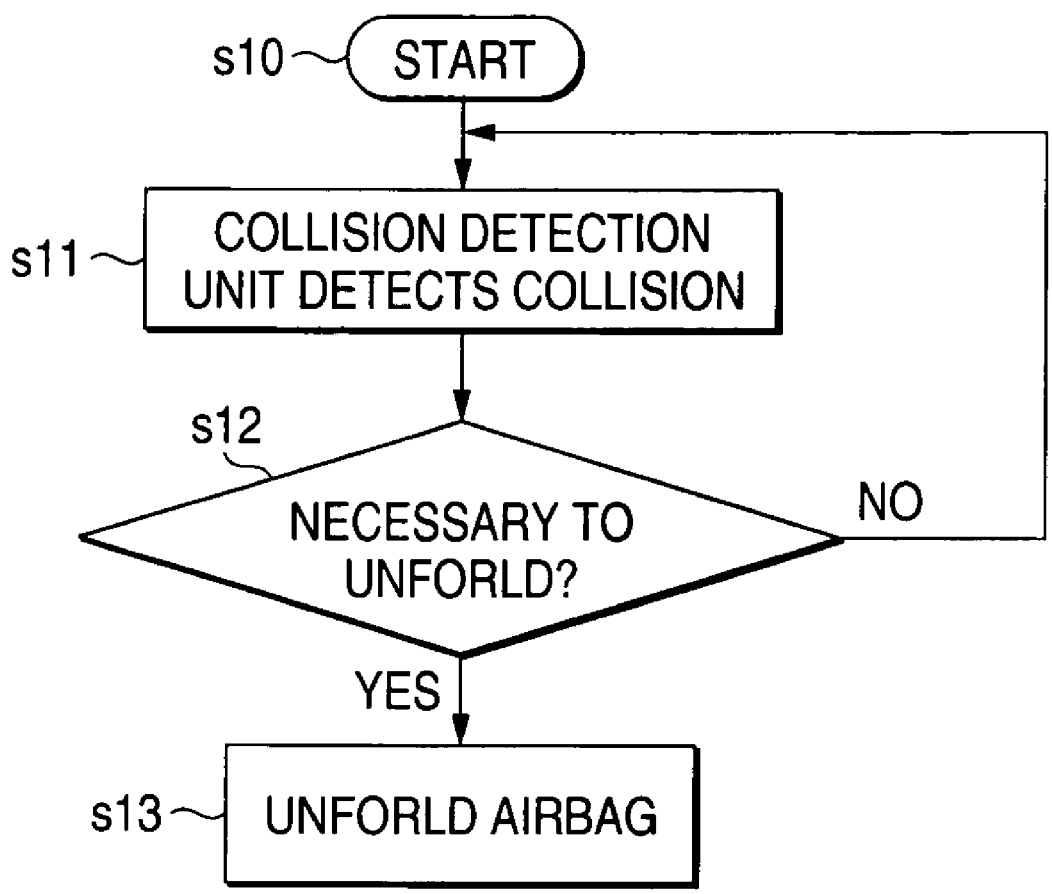

VEHICLE PROTECTION APPARATUS AT COLLISION TIME

The present disclosure relates to the subject matter contained in Japanese Patent Application No.2002-245726 filed on Aug. 26, 2002, which is incorporated herein by reference in its entirety.

BACKGROUND OF THE INVENTION

1. Field of the Invention

The present invention relates to a vehicle protection apparatus at collision time for protecting a human body when a collision occurs between a vehicle of an automobile and a two-wheeled vehicle or a pedestrian.

2. Description of the Related Art

Hitherto, shock absorption by a car body, equipment of air bags, and the like have been planned to protect a vehicle passenger if the automobile encounters an accident. Further, it has been proposed to install an apparatus for protecting a pedestrian, etc., when a vehicle comes into collision with the pedestrian, etc., in the vehicle. For example, JP-A-8-258667 discloses a hood air bag apparatus for exploding an air bag on a hood of a vehicle body when the running vehicle comes into collision with a pedestrian and further covering the pedestrian with a drop prevention net if the pedestrian drops onto the hood. As a related art of exploding an air bag to the outside of a car body at the collision time, JP-A-7-277114 discloses a shock body diving-under prevention apparatus for exploding an air bag below the vehicle to prevent the shock body causing a shock from diving under the vehicle if the shock is given to the back of the vehicle.

Hitherto, as protection apparatus at the vehicle collision time, those for protecting vehicle passengers and pedestrians have been designed. However, protection for such a case where a passenger of a two-wheeled vehicle is knocked over when an automobile comes in collision with the two-wheeled vehicle is not much considered. When a two-wheeled vehicle, particularly, a motorcycle such as an autobicycle comes in collision with a vehicle, such as a head-on collision, often the relative speed with the vehicle is very increased. It is feared that the passenger of the two-wheeled vehicle may be knocked over so as to jump above the vehicle of an automobile and drop just before the following vehicle and a secondary disaster may occur, enlarging the injury leading to dying. Particularly, if an autobicycle on which two persons ride double or the like comes in collision with a vehicle, there is a large possibility that the fellow passenger will be knocked over to the opposite side to the vehicle collision point as compared with the driver.

In JP-A-8-258667, the air bag, etc., is exploded onto the top of the hood of the car body, namely, the vehicle hood or so and effective protection cannot be provided against such a collision causing a passenger to jump the vehicle.

SUMMARY OF THE INVENTION

It is an object of the invention to provide a vehicle protection apparatus at collision time that can effectively protect a human body hit and jumping the car body when an automobile comes in collision with a two-wheeled vehicle, etc.

A vehicle protection apparatus (1) includes a collision detection unit, a protection determination unit, and a net unfolding unit. The collision detection unit detects a collision of a car body with a body. The protection determination unit determines necessity for protection of the body with which the car body comes in collision on the basis of the detection result of the collision detection unit. The net unfolding unit unfolds a protection net on the car body when the protection determination unit determines that it is necessary to protect the body with which the car body comes in collision.

To protect a body (containing a human body) coming in collision with the vehicle and knocked over on the car body, the vehicle protection apparatus (1) includes the collision detection unit, the protection determination unit, and the net unfolding unit. When the collision detection unit detects a collision, the protection determination unit determines the necessity for protection of the knocked-over body. When the protection determination unit determines that it is necessary to protect the body, the net unfolding unit unfolds the protection net on the car body. Even when the passenger of a two-wheeled vehicle, etc., is knocked over in a collision and is about to jump the car body, the passenger can be caught in the unfolded protection net for preventing the body from jumping the vehicle. Thus, the body (containing the human body of the passenger, etc.,) can be protected effectively.

In the vehicle protection apparatus (2), the net unfolding unit unfolds the protection net so that the protection net is upright on the car body.

Thus, the body attempting to jump the vehicle can be effectively caught for protection.

A vehicle protection apparatus (3) includes a collision detection unit, a protection determination unit, and an unfolding unit. The collision detection unit detects a collision of a car body with a body. The protection determination unit determines necessity for protection of the body with which the car body comes in collision on the basis of the detection result of the collision detection unit. The unfolding unit unfolds at least one shock absorber from the car body when the protection determination unit determines that it is necessary to protect the body with which the car body comes in collision. The collision detection unit further detects collision strength and a collision position on the car body. The protection determination unit determines a position and number of the shock absorber to be unfolded by the unfolding unit on the basis of the collision strength and the collision position detected by the collision detection unit.

In the vehicle protection apparatus (3), the protection determination unit determines the positions and the number of the shock absorber to be unfolded on the car body based on the collision strength and the collision position. Thus, the shock absorber can be unfolded appropriately in response to the situation of the collision and the body attempting to jump the vehicle in the collision can be protected effectively. A protection net and an air bag can be named as the shock absorbers. However, the shock absorbers are not limited to them. Any material and structure can be used if the purpose of absorbing shock can be accomplished.

In the vehicle protection apparatus (4), when the collision detection unit detects the collision of the car body with the body at least one of at front and rear of the car body, the protection determination unit determines that at least one shock absorber in the back and forth direction of the car body is the shock absorber to be unfolded by the unfolding unit.

If the vehicle comes in collision with a two-wheeled vehicle, etc., at the front or rear of the vehicle, the human body of the passenger of the two-wheeled vehicle, etc., attempts to jump to the rear or front of the vehicle. In such a case, in the vehicle protection apparatus (4), the shock absorber is unfolded at least at one point in the back and forth direction of the car body. Thus, the body jumping the vehicle can be caught for effective protection.

In the vehicle protection apparatus (5), when the collision detection unit detects the collision of the car body with the body at least one of at left and right of the car body, the protection determination unit determines that at least one shock absorber in the side-to-side direction of the car body is the shock absorber to be unfolded by the unfolding unit.

If the vehicle comes in collision with a two-wheeled vehicle, etc., at the left or right of the vehicle, the human body of the passenger of the two-wheeled vehicle, etc., attempts to jump to the right or left of the vehicle. In such a case, in the vehicle protection apparatus (5), the shock absorber is unfolded at least at one point in the side-to-side direction of the car body. Thus, the body jumping the vehicle can be caught for effective protection.

In the vehicle protection apparatus (6), the collision detection unit determines whether or not the body with which the car body comes in collision is a two-wheeled vehicle. The protection determination unit determines the positions and the number of the shock absorbers to be unfolded by the unfolding means based on the collision strength, the collision position, and determination of the collision detection unit.

Thus, in a collision between a four-wheeled vehicle and a two-wheeled vehicle in which casualties (killed and seriously wounded) easily occur, the shock absorbers can be unfolded for appropriate protection.

In a vehicle protection method (1), the strength of a collision of a car body with a body and the collision position on the car body are detected, the positions and the number of shock absorber to be unfolded are determined based on the detected collision strength and position, and the shock absorber is unfolded from the car body based on the determining.

BRIEF DESCRIPTION OF THE DRAWINGS

In the accompanying drawings:

FIG. 11 shows an outline of electric circuitry of the vehicle protection apparatus 100; and FIG. 12 is a flowchart to show the operation of the vehicle protection apparatus 100 of the second embodiment of the invention.

DETAILED DESCRIPTION OF THE PREFERRED EMBODIMENT

First Embodiment

Figure 1:
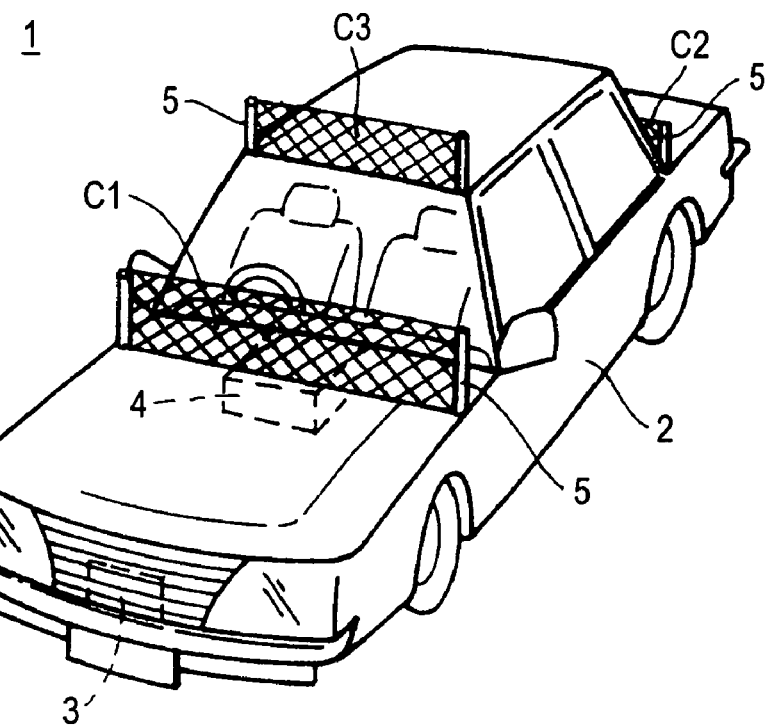
FIG. 1 is a schematic perspective view to show an example of a protection operation state in a vehicle protection apparatus 1 at collision time as a first embodiment of the invention.

FIG. 1 shows an example of an operation state of a vehicle protection apparatus 1 at collision time, according to a first embodiment of the invention. The vehicle protection apparatus 1 at collision time unfolds one or a combination of protection nets C1, C2, and C3 to protect a human body hit by a car body 2 when a vehicle such as an automobile comes in collision with a two-wheeled vehicle, etc. That is, the vehicle protection apparatus 1 at collision time includes a collision detection unit 3 for detecting a collision, a protection determination unit 4 for determining the necessity for protection of the hit human body when the collision detection unit 3 detects a collision, and a net unfolding unit 5 for unfolding the protection nets C1, C2, and C3 on the car body 2 when the protection determination unit 4 determines that protection of the human body is necessary.

In FIG. 1, when the collision detection unit 3 detects a collision at the front or rear of the car body 2 of the vehicle, the net unfolding unit 5 unfolds the protection net C1, C2, C3 at one or more places in the back and forth direction of the car body 2 in response to the degree of the collision determined by the protection determination unit 4. If the vehicle comes in collision with a two-wheeled vehicle, etc., at the front or rear of the car body 2, the human body of the passenger of the two-wheeled vehicle, etc., attempts to jump behind or ahead the car body 2. When the collision detection unit 3 detects a collision at the front or rear of the car body 2, the net unfolding unit 5 unfolds the protection net C1, C2, C3 at one or more places in the back and forth direction of the car body 2 in response to the degree of the collision determined by the protection determination unit 4, so that the human body attempting to jump the car body 2 can be caught for effective protection. Since the human body or the body with which the vehicle comes in collision does not jump the car body 2, injuries caused by a secondary disaster can be decreased.

Figure 2:
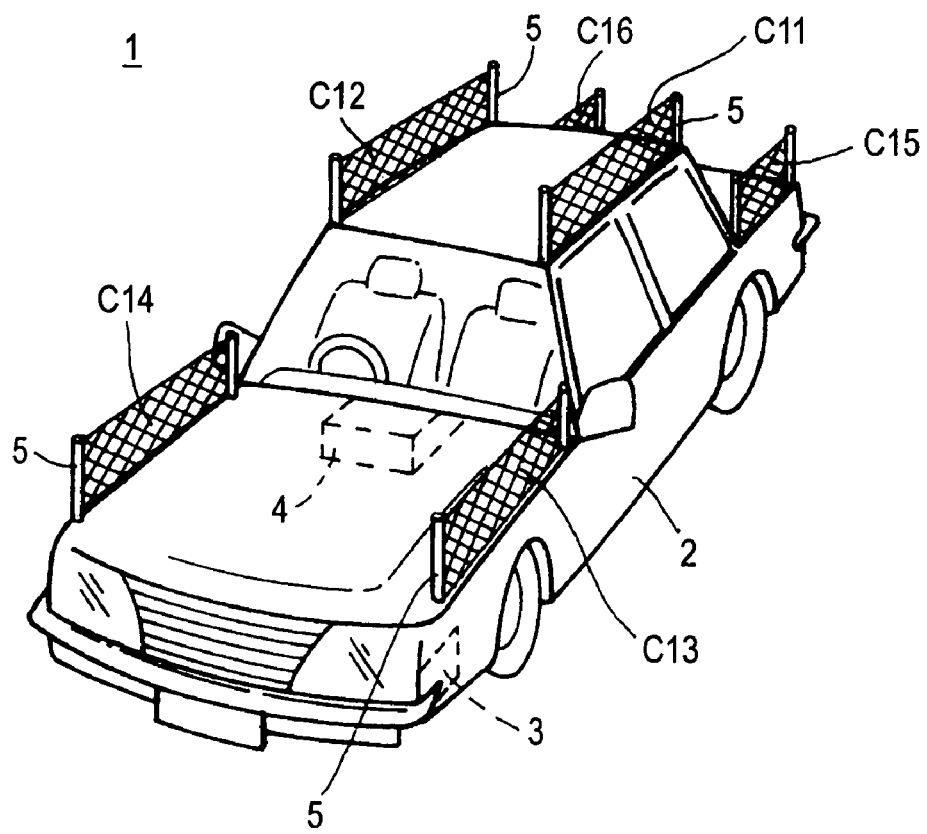
FIG. 2 is a schematic perspective view to show another example of a protection operation state in the vehicle protection apparatus 1 at collision time in FIG. 1.

FIG. 2 shows another example of an operation state of the vehicle protection apparatus 1 at collision time, according to the first embodiment of the invention. When the collision detection unit 3 detects a collision at the left or right of the car body 2, the net unfolding unit 5 unfolds protection net C11, C12, C13, C14, C15, C16 at one or more places in the side-to-side direction of the car body 2 in response to the degree of the collision determined by the protection determination unit 4. If the vehicle comes in collision with a two-wheeled vehicle, etc., on the left side, the right side, etc., of the car body 2, the human body of the passenger of the two-wheeled vehicle, etc., attempts to jump to the right or left of the car body 2. When the collision detection unit 3 detects a collision at the left or right of the car body 2, the net unfolding unit 5 unfolds the protection net C11, C12, C13, C14, C15, C16 at one or more places in the side-to-side direction of the car body 2 in response to the degree of the collision determined by the protection determination unit 4, so that the human body attempting to jump the car body 2 can be caught for effective protection. The protection nets C11, C12, C13, C14, C15, and C16 are divided into plural parts and are unfolded at each part of the side in the back and forth direction of the car body 2, but may be unfolded so as to cover the whole side, of course. In FIGS. 1 and 2, the object to be protected may be any body other than the human body as well as the human body.

Figure 3:
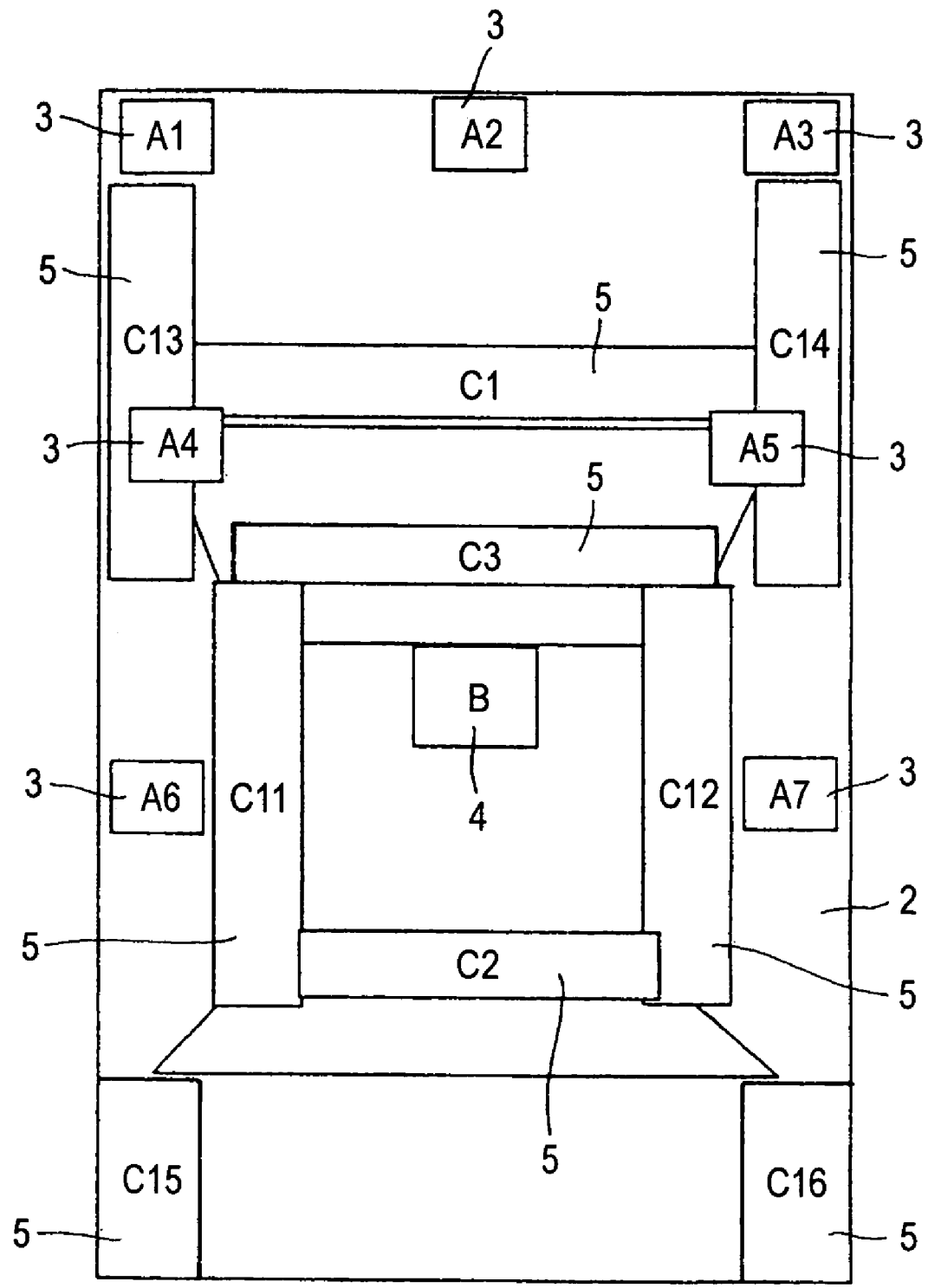
FIG. 3 is a schematic plan view to show plane layout of the vehicle protection apparatus 1 at collision time in FIG. 1.
Figure 4:
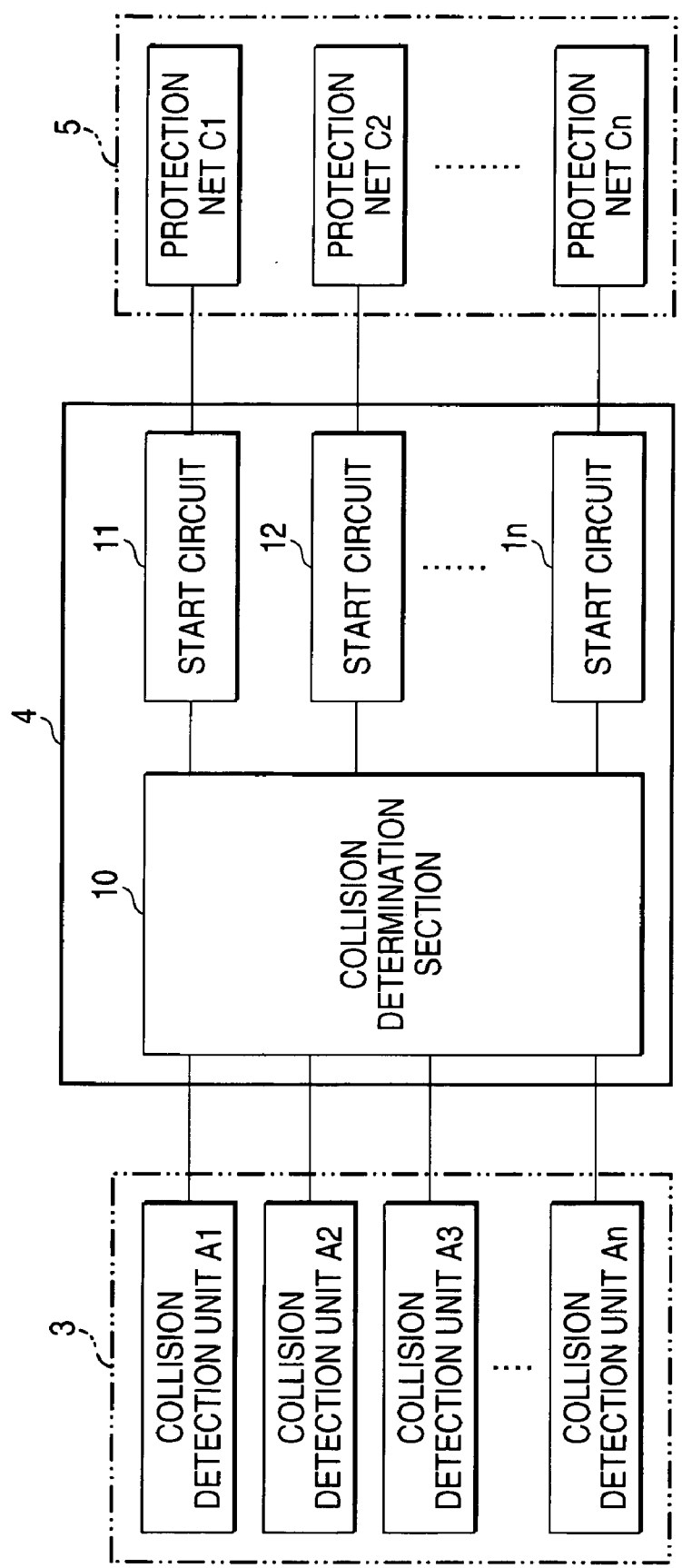
FIG. 4 is a block diagram to show a schematic electric configuration of the vehicle protection apparatus 1 at collision time in FIG. 1.

FIG. 3 shows plane layout of the collision detection unit 3, the protection determination unit 4, and the net unfolding unit 5 in the vehicle protection apparatus 1 at collision time shown in FIGS. 1 and 2 with the top of FIG. 3 made to correspond to the front of the car body 2. FIG. 4 shows a schematic electric configuration of the vehicle protection apparatus 1 at collision time. The collision detection unit 3 includes a plurality of detection unit A1, A2, A3, .... Each detection unit A1, A2, A3, ... is implemented as a radar sensor, a G sensor, etc., for detecting approach of the object with which the vehicle is about to come in collision, and shock acceleration G at the collision time. A camera, etc., can also be placed so as to determine a collision from an image. The protection determination unit 4 is, for example, an electronic control unit (ECU) for performing unfolding control of the protection nets C1, C2, C3, C11, C12, C13, C14, C15, and C16, implemented as a microcomputer, etc., including a collision determination section 10 for determining the necessity for protection and start circuits 11, 12, . . . , in for starting unfolding of the protection nets C1, C2, . . . , Cn in accordance with a preset program.

As shown in FIG. 3, the detection units A1, A2, and A3 are placed at the front of the car body 2. The detection unit A1, A2, and A3 are placed in the front right corner, at the center, and in the front left corner of the car body 2, respectively. The detection units A1 and A3 also contribute to detection of a collision at the left and right of the vehicle. The detection units A4, A5, A6, and A7 are placed on sides of the vehicle; the detection units A4 and A6 are placed at the left of the vehicle and the detection units A5 and A7 are placed at the right of the vehicle. Each detection unit A1, A2, A3; A4, A5, A6, A7 can best detect a collision at the closet position, but can also detect a collision at a distant position. For example, if the detection unit is not placed at the rear of the car body 2, a collision can be detected to some extent by the detection unit A6, A7. The possibility that a collision with a two-wheeled vehicle, which is one of subjects of the invention, may occur at the rear of the car body 2 is small as compared with that at the front of the car body 2. The possibility that the passenger of a two-wheeled vehicle, etc., may jump the car body 2 from the rear to the front is small. Therefore, it is not necessary to disposed the detection unit at the rear of the car body 2.

The net unfolding unit 5 includes supports that can come out from and enter the car body 2 for holding the protection net C1, C2, C3, C11, C12, C13, C14, C15, C16 between the supports. The supports are driven by a cylinder, a motor, etc. Each support can also be urged so as to project by a spring and project with a latch detached by a solenoid, etc. When the supports are housed in the car body 2, the protection nets C1, C2, C3, C11, C12, C13, C14, C15, and C16 are also folded. The vehicle protection apparatus 1 at collision time, according to the embodiment unfolds the protection net C1, C2, C3, C11, C12, C13, C14, C15, C16 on the car body 2 to protect the human body coming in collision with the vehicle and hit by the car body 2. Even when the passenger of a two-wheeled vehicle, etc., is hit in a collision and is about to jump the car body 2, the passenger can be caught in the protection net C1, C2, C3, C11, C12, C13, C14, C15, C16 unfolded so as to be upright on the car body 2 for preventing the passenger from jumping the car body 2 for effectively protecting the human body of the passenger, etc.

Figure 5:
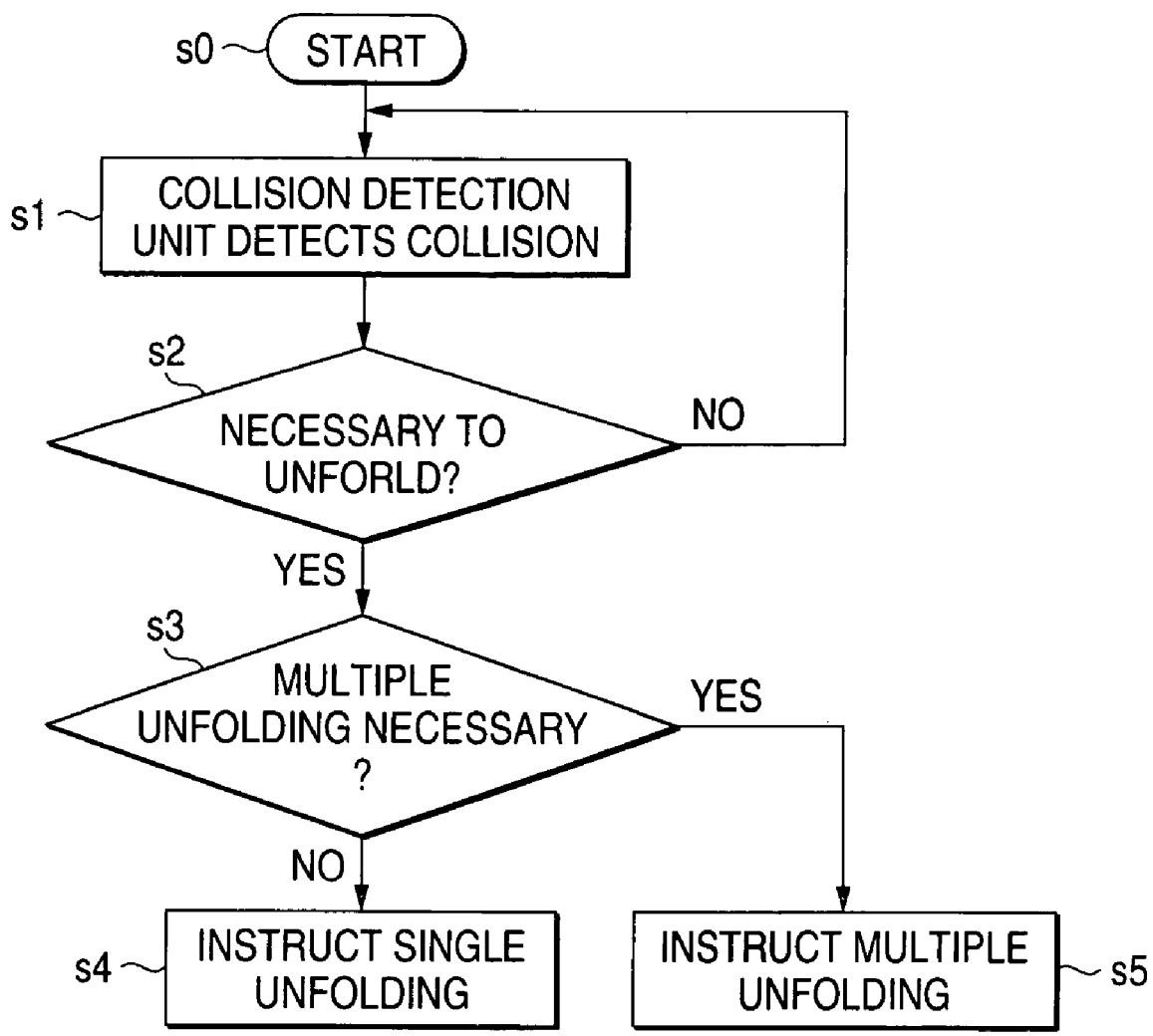
FIG. 5 is a flowchart to show a schematic protection procedure of the vehicle protection apparatus 1 at collision time in FIG. 1.

FIG. 5 shows a protection control procedure of the collision determination section 10, etc., shown in FIG. 4 in the vehicle protection apparatus 1 at collision time, according to the embodiment. The procedure is started at step s0. At step s1, the collision determination section 10 determines whether or not any detection unit A1, A2, A3, A4, A5, A6, A7 detects a collision based on a signal output from the detection unit A1, A2, A3, A4, A5, A6, A7. The output signal may contain a signal indicating the strength of a collision of the vehicle with a body. At step s2, the collision determination section 10 determines whether or not it is necessary to unfold the protection net C1, C2, C3, C11, C12, C13, C14, C15, C16 based on the detection result. If the collision determination section 10 does not determine that it is necessary to unfold, the process returns to step s1. If the collision determination section 10 determines at step s2 that it is necessary to unfold, the process goes to step s3 and the collision determination section 10 determines whether or not it is necessary to unfold two or more of the protection nets C1, C2, C3, C11, C12, C13, C14, C15, and C16. If the collision determination section 10 determines that it is unnecessary to unfold two or more, the collision determination section 10 gives a single unfolding instruction at step s4 to unfold, for example, the protection net closest to the collision point with the car body 2.

If the collision determination section 10 determines at step s3 that it is necessary to unfold two or more, the collision determination section 10 gives a multiple unfolding instruction at step s5. For example, all the protection nets placed in the back and forth direction or on the sides can be unfolded as shown in FIG. 1 or 2, or the number of the protection nets to be unfolded can be determined in response to the degree of the collision.

Figure 6:
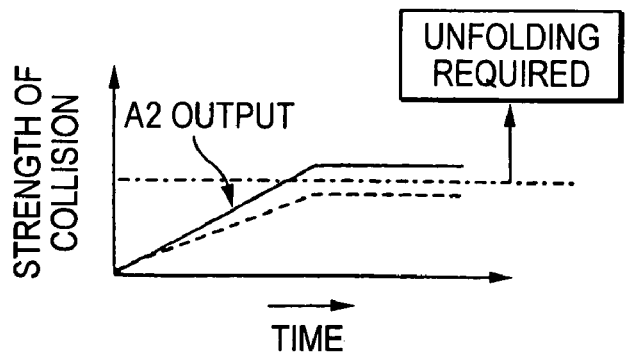
FIG. 6 is a graph to show an example of determination of necessity for protection net unfolding in response to the strength of collision in the vehicle protection apparatus 1 at collision time in FIG. 1.

FIG. 6 shows the reference for determining the necessity for unfolding in response to output of the detection unit A2 using a G sensor at step s2 of FIG. 5 when a collision occurs at the front of the car body 2, for example. When the output of the detection unit A2 exceeds the reference level indicated by the alternate long and short dash line, it is determined that unfolding is necessary. If the strength of the collision is within the reference range as indicated by the dashed line, it is determined that the human body is not knocked over and it is also determined that it is unnecessary to unfold the protection net.

Figure 7:
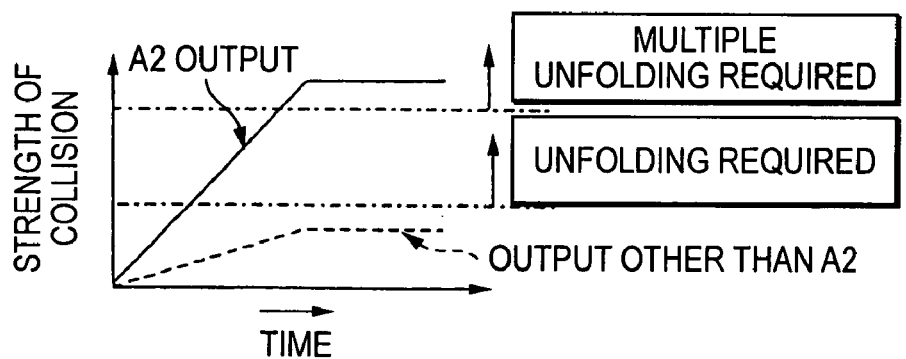
FIG. 7 is a graph to show an example of determination of necessity for unfolding multiple protection nets in response to the strength of collision in the vehicle protection apparatus 1 at collision time in FIG. 1.

FIG. 7 shows a case where output of the detection unit A2 at the center of the front of the car body 2 exceeds a reference level at which it is determined that unfolding is necessary and further exceeds another reference level at which it is determined that multiple unfolding is necessary, corresponding to step S3 of FIG. 5. However, it is assumed that output from any other detection unit does not reach the reference level at which it is determined that unfolding is necessary. Thus, if only output of the detection unit A2 exceeds the reference level at which it is determined that multiple unfolding is necessary, it is determined that a strong collision exists from the front of the car body 2, and the two protection nets C1 and C3 or all of the protection nets C1, C2, and C3 are controlled to unfold. If output of the detection unit A2 only exceeds the reference level at which it is determined that unfolding is necessary and does not exceed the reference level at which it is determined that multiple unfolding is necessary and output of any other detection unit does not exceed the reference level at which it is determined that unfolding is necessary, only the protection net C1 is controlled to unfold. Thus, the protection net to be unfolded is selected depending on the placement position of the detection unit whose output exceeds the reference level.

Figure 8:
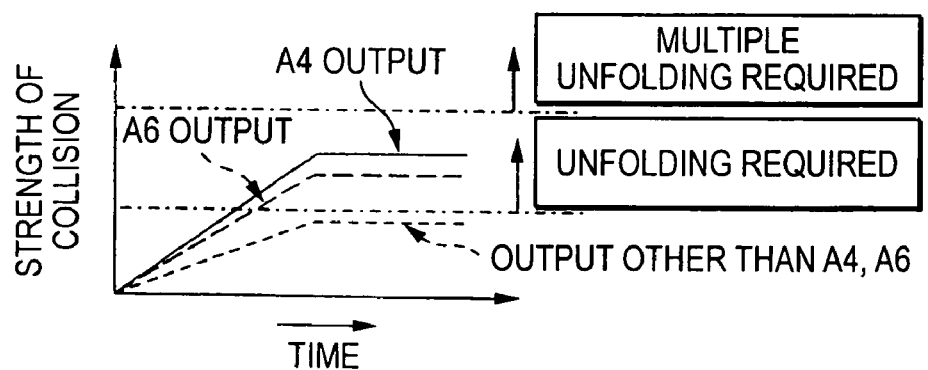
FIG. 8 is a graph to show an example of determination of necessity for unfolding multiple protection-nets in response to the strength of collision in the vehicle protection apparatus 1 at collision time in FIG. 1.

FIG. 8 also shows the case where outputs of the detection unit A4 and A6 at the left of the car body 2 exceed the reference level at which it is determined that unfolding is necessary and do not exceed the reference level at which it is determined that multiple unfolding is necessary and output of any other detection unit does not exceed the reference level at which it is determined that unfolding is necessary, corresponding to step S3 in FIG. 5. In such a case, the protection nets C13 and C11 placed corresponding to the detection unit A4 and A6 at the left of the car body 2 are unfolded.

That is, the detection unit A1 to A7 also detect the place and direction of a collision, the protection determination unit 4 determines how much the human body will be knocked over by the collision, and the net unfolding unit 5 changes the positions and the number of the protection nets C1, C2, C3, C11, C12, C13, C14, C15, and C16 to be unfolded on the car body 2 in response to the collision place and direction detected by the detection unit A1 to A7 and the collision degree determined by the protection determination unit 4.

If a strong collision exists at the front of the car body 2, the protection nets C1 and C3 are unfolded.

If a collision exists on the detection unit A4 only or an equal collision exists on the detection unit A4 and A6 at the left of the car body 2, the protection nets C13 and C11 are unfolded.

If a strong collision exists in the installation part of the detection unit A7 at the right of the car body 2, the protection nets C14 and C12 are unfolded.

If a collision from the left slanting direction of the car body 2 is detected using a radar sensor, etc., as the detection unit A1, the protection nets C1 and C14 are unfolded.

The collision detection unit 3 can also determine whether or not the collision is a collision with a two-wheeled vehicle in response to the collision degree. If image processing is performed with a camera, etc., whether or not the collision is a collision with a two-wheeled vehicle can be determined furthermore reliably. Whether or not the passenger is about to jump the car body 2 can also be determined. The protection determination unit 4 determines the necessity for protection of the passenger of the two-wheeled vehicle in accordance with the detection result of the collision detection unit 3. When it is determined that the passenger needs to be protected, the passenger can be protected appropriately by unfolding the protection net C1, C2, C3, C11, C12, C13, C14, C15, C16. Not only the passenger of the two-wheeled vehicle, but also pedestrians can be protected, of course.

In FIGS. 1 and 2, the protection nets C1 and C13 and C14 are placed at the front and on the sides of the car body 2, but protection nets crossing each other like a letter X can also be unfolded on the hood, for example, for providing commonality of protection at the front and protection on the sides. For similar commonality, protection nets crossing each other like a letter X can also be unfolded on the roof, trunk lid, etc, of the vehicle.

[Second Embodiment]

Next, a vehicle protection apparatus 100 at collision time, of a second embodiment of the invention will be discussed. Members identical with those of the vehicle protection apparatus 1 of the first embodiment previously described with reference to the accompanying drawings are denoted by the same reference numerals in FIGS. 9 to 12 and will not be discussed again.

Figure 9:
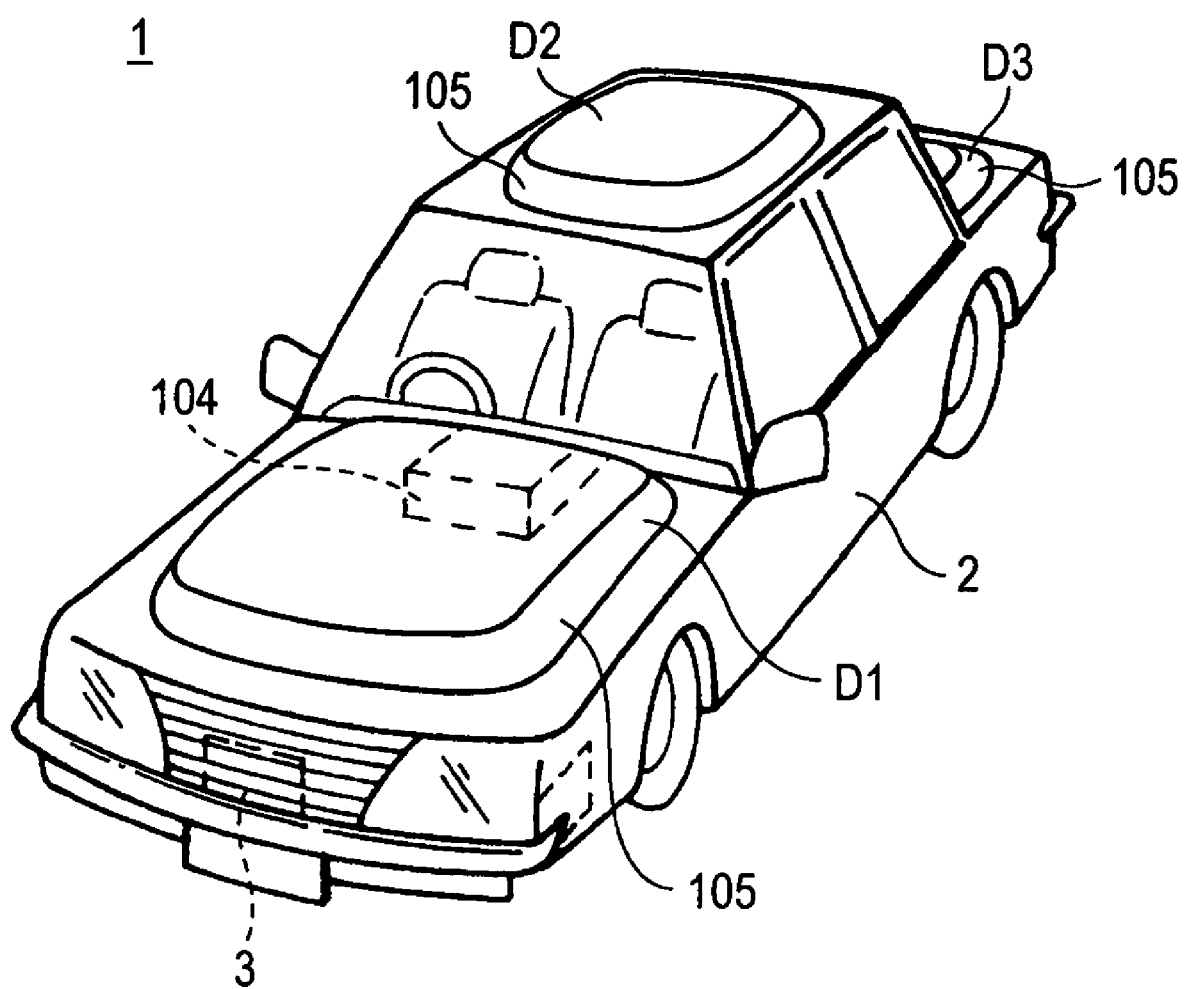
FIG. 9 shows an example of an operation state of a vehicle protection apparatus 100 at collision time, of a second embodiment of the invention.

FIG. 9 shows an example of an operation state of the vehicle protection apparatus 100 at collision time. The vehicle protection apparatus 100 at collision time unfolds at least one of air bags D1, D2, and D3 to protect a human body knocked over on a car body 2 when a vehicle such as an automobile comes in collision with a two-wheeled vehicle, etc. Two or more of the airbags D1, D2, and D3 may be unfolded. That is, the vehicle protection apparatus 100 includes collision detection unit 3 for detecting a collision between a body and the car body 2, protection determination unit 104 for determining the necessity for air bag unfolding based on the detection of the collision detection unit 3, and air bag exploding unit 105 for unfolding the air bags D1, D2, and D3 on the car body 2 based on the determination of the protection determination unit 104.

FIG. 9 shows that the air bag exploding unit 105 unfolds the air bags D1, D2, and D3. For example, if a collision of the car body 2 with a two-wheeled vehicle occurs, it is feared that the passenger of the two-wheeled vehicle may be hurled and the car body 2 may knock down the passenger. When the collision detection unit 3 detects a collision of the car body 2 with a body (for example, a two-wheeled vehicle), the collision detection unit 3 detects the strength of the collision of the car body 2 with the body at the same time. The protection determination unit 104 determines the air bags (the positions and the number of the air bags) to be unfolded based on the collision strength detected by the collision detection unit 3 and the collision positions on the car body 2. The air bag exploding unit 105 unfolds at least one of the air bags D1, D2, and D3 based on the determination of the protection determination unit 104. Thus, the car body 2 can be prevented from knocking down the hurled passenger of the two-wheeled vehicle and safety of the passenger of the two-wheeled vehicle can be ensured. Since the air bag D1, D2, D3 is unfolded, damage to the car body 2 can also be prevented when the two-wheeled vehicle or the passenger comes in collision with the hood or roof of the car body 2.

Figure 10:
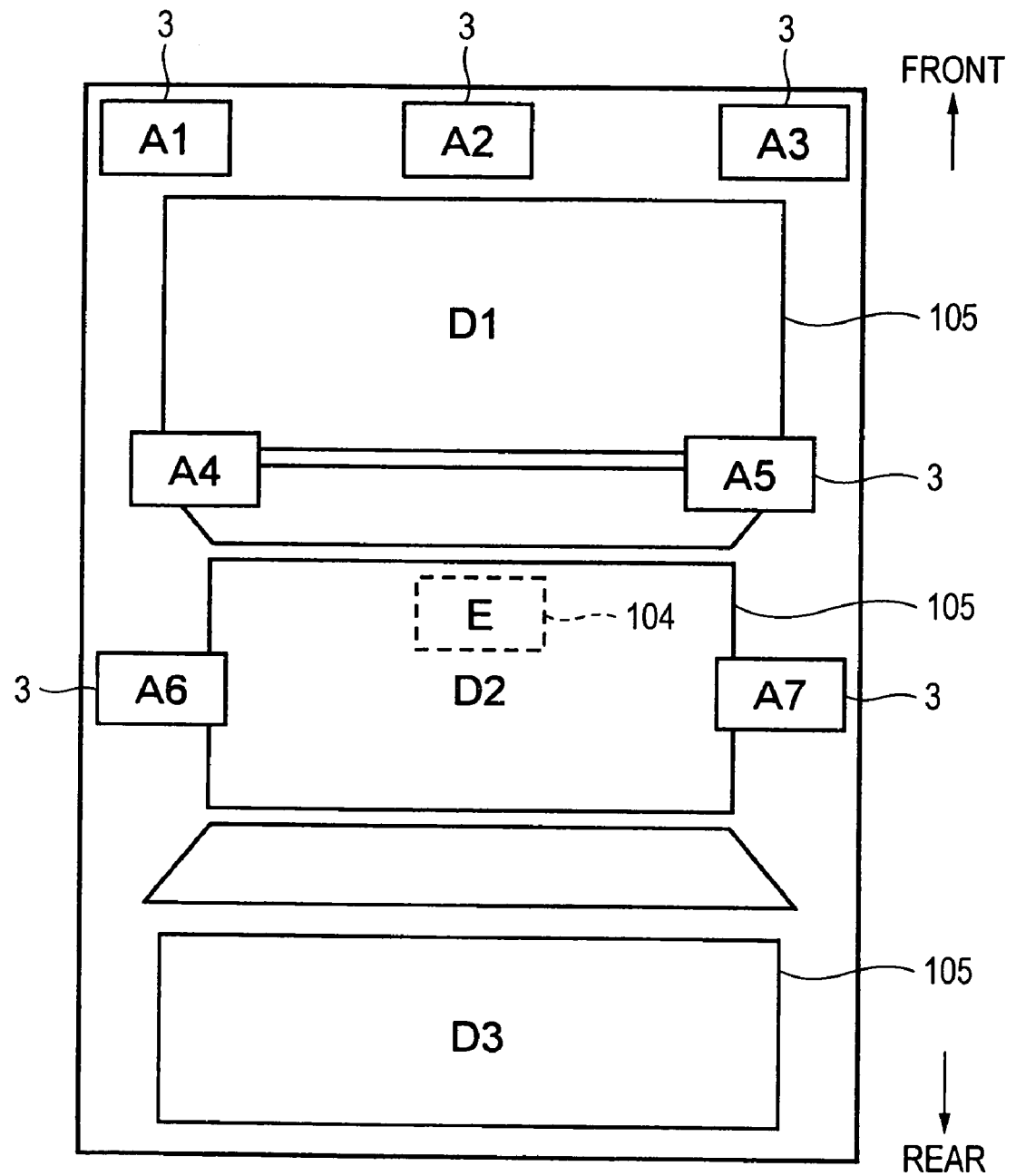
FIG. 10 shows an example of a plane layout drawing of collision detection unit 3, protection determination unit 104, and air bag exploding unit 105 in the second embodiment of the invention.

FIG. 10 shows an example of a plane layout drawing of the collision detection unit 3, the protection determination unit 104, and the air bag exploding unit 105 in the embodiment. The top of FIG. 10 corresponds to the front of the car body 2 and the bottom corresponds to the rear of the car body 2. FIG. 11 shows an outline of electric circuitry of the vehicle protection apparatus 100. The protection determination unit 104 is an electronic control unit (ECU) for controlling unfolding of the air bags D1, D2, and D3. The protection determination unit 104 includes a collision determination section 10 for determining the necessity for protection based on a signal output from detection unit A1 to An and start circuits 111 to 11$n$ for unfolding the air bags D1, D2, and D3.

The air bag exploding unit 105 supplies gas to air bags D1 to Dn based on output from the start circuits 111 to 11$n$ for inflating the air bags D1 to Dn. Known air bags can be used as the air bags D1 to Dn.

FIG. 12 is a flowchart to show the operation of the vehicle protection apparatus 100 of the embodiment. The operation procedure is started at step s10. At step s11, the collision determination section 10 determines whether or not any detection unit A1, A2, A3, A4, A5, A6, A7 detects a collision of the car body 2 with a body based on a signal output from the detection unit A1, A2, A3, A4, A5, A6, A7. The signal may contain a signal indicating the strength of a collision of the vehicle with the body. At step s12, the collision determination section 10 determines whether or not it is necessary to unfold the air bag D1 to D3 based on the detection result of the detection unit A1 to A7. The necessity for unfolding the air bag D1 to D3 is determined by the strength of the collision as in the first embodiment. If the collision determination section 10 determines that it is unnecessary to unfold, the process returns to step s10. If the collision determination section 10 determines that it is necessary to unfold, the air bag exploding unit 105 unfolds the air bag D1 to D3 at step s13. Whether some or all of the air bags are to be unfolded may be determined in response to the collision strength and the collision position on the car body as in the first embodiment. That is, the collision determination section 10 may determine the number and positions of the air bags to be unfolded based on the strength of the collision between the body and the car body 2 and the collision position on the car body. For example, if the detection unit A6 or A7 only detects a strong collision, the possibility that the knocked-over body will again come in collision with the front of the car body 2 is low. In this case, the air bag exploding unit 105 may unfold only the air bag D2, D3.

Protection of a human body and a body by the protection nets has been described in the first embodiment, and protection of a human body and a body by the air bags has been described in the second embodiment. The invention also includes a vehicle protection apparatus having both the protection nets and the air bags, needless to say. As both the protection nets and the air bags are provided, the vehicle protection apparatus can protect a human body and a body furthermore reliably. The numbers of the components of the collision detection unit 3, the net unfolding unit 5, and the air bag exploding unit 105 are not limited to those disclosed in the embodiment. Any numbers of the components of the collision detection unit 3, the net unfolding unit 5, and the air bag exploding unit 105 may be used as required. It is understood that any changes and modifications may be made in the invention without departing from the spirit and scope thereof.

As described above, according to the embodiment of the invention, to protect a human body coming in collision with the vehicle and knocked over on the car body, the protection nets are unfolded on the car body and even when the human body is about to jump the vehicle, the human body can be caught in the unfolded protection net for effectively protecting the human body.

According to the embodiment of the invention, the protection net is unfolded so as to be upright on the car body, so that the body attempting to jump the vehicle can be caught for effective protection.

According to the embodiment of the invention, the positions and the number of the protection nets to be unfolded on the car body are changed in response to the collision place and direction and the collision degree, so that the protection nets can be unfolded appropriately in response to the situation of the collision and the human body attempting to jump the vehicle in the collision can be protected effectively. Since the human body is prevented from jumping the vehicle, a secondary disaster that can occur if the human body jumps the vehicle or the like can also be prevented from occurring.

According to the embodiment of the invention, the human body attempting to jump to the rear or front of the vehicle in collision at the front or rear of the vehicle can be caught in the protection net unfolded at one or more places in the back and forth direction of the car body in response to the degree of the collision and can be protected effectively.

According to the embodiment of the invention, the human body attempting to jump to the right or left of the vehicle in collision at the left or right of the vehicle can be caught in the protection net unfolded at one or more places in the side-to-side direction of the car body in response to the degree of the collision and can be protected effectively.

According to the embodiment of the invention, when a collision with a two-wheeled vehicle occurs, the necessity for protecting the passenger is determined and when it is determined that the passenger needs to be protected, the protection net can be unfolded for appropriately protecting the passenger.

What is claimed is:

1. A vehicle protection apparatus, comprising:
   a collision detection unit for detecting a collision of a car body with an external body;
   a protection determination unit for determining necessity for protection of the external body with which the car body comes in collision on the basis of the detection result of the collision detection unit; and
   an unfolding unit for unfolding at least one shock absorber from the car body when the protection determination unit determines that it is necessary to protect the external body with which the car body comes in collision, wherein:
   the collision detection unit further detects collision strength and a collision position on the car body; and
   the protection determination unit determines which shock absorber and the number of the shock absorbers to be unfolded by the unfolding unit on the basis of the collision strength and the collision position detected by the collision detection unit.

2. The vehicle protection apparatus according to claim 1, wherein when the collision detection unit detects the collision of the car body with the external body at least one of at front and rear of the car body, the protection determination unit determines that at least one shock absorber in the back and forth direction of the car body is the shock absorber to be unfolded by the unfolding unit.

3. The vehicle protection apparatus according to claim 1, wherein when the collision detection unit detects the collision of the car body with the external body at least one of at left and right of the car body, the protection determination unit determines that at least one shock absorber in the side-to-side direction of the car body is the shock absorber to be unfolded by the unfolding unit.

4. The vehicle protection apparatus according to claim 1, wherein each shock absorber is an air bag.

5. The vehicle protection apparatus according to claim 1, wherein each shock absorber is a protection net.

6. The vehicle protection apparatus according to claim 1, wherein:
   the shock absorber is a plurality of shock absorbers; and
   the shock absorbers include at least one protection net and at least one air bag.

7. The vehicle protection apparatus according to claim 1, wherein:
   the collision detection unit determines whether or not the external body with which the car body comes in collision is a two-wheeled vehicle;
   the protection determination unit determines which shock absorber and the number of the shock absorbers to be unfolded by the unfolding unit on the basis of the collision strength, the collision position, and the determination of the collision detection unit.

8. The vehicle protection apparatus according to claim 1, wherein: the shock absorber has at least a protection net; and the unfolding unit unfolds the protection net so that the protection net is upright on the car body.

9. The vehicle protection apparatus according to claim 1, wherein the protection determination unit compares a plurality of reference values with the collision strength and then determines the number of the shock absorbers to be unfolded by the unfolding unit.

10. A vehicle protection method, comprising:

detecting strength of a collision of a car body with an external body and a collision position on an exterior of the car body;

determining which shock absorber and the number of the shock absorbers to be unfolded on the basis of the detected collision strength and the detected collision position; and unfolding the shock absorber from the car body toward outside of the car body on the basis of the determining.

11. A vehicle protection method, comprising:

detecting strength of a collision of a car body with an external body and a collision position on an exterior of the car body;

determining which shock absorber and the number of the shock absorbers to be unfolded on the basis of the detected collision strength and the detected collision position;

unfolding the shock absorber from the car body on the basis of the determining; and determining whether or not the external body with which the car body comes in collision is a two-wheeled vehicle, wherein:

in the step of determining which shock absorber and the number of the shock absorbers to be unfolded, a position and the number of the shock absorbers to be unfolded are determined on the basis of the collision strength, the collision position, and the determining.

12. A vehicle protection method, comprising:

detecting strength of a collision of a car body with an external body and a collision position on an exterior of the car body;

determining which shock absorber and the number of the shock absorbers to be unfolded on the basis of the detected collision strength and the detected collision position; and unfolding the shock absorber from the car body on the basis of the determining, wherein in the step of determining the position and the number of shock absorbers to be unfolded, a plurality of reference values are compared with the collision strength and then the number of the shock absorbers to be unfolded is determined.

* * * * *